Patented Sept. 14, 1948

2,449,194

UNITED STATES PATENT OFFICE 2,449,194

N-DIHYDROXYPROPYL PHENYL-ACETAMIDE

Otto K. Behrens and Joseph W. Corse, Indianapolis, Ind., assignors to Eli Lilly and Company, Indianapolis, Ind., a corporation of Indiana No Drawing. Application August 24, 1945, Serial No. 612,531

1 Claim. (Cl. 260—558)

This invention relates to a new organic compound and is directed to a new N-phenylacetylated amino alcohol.

The new compound provided by this invention is N-(1,3-dihydroxy-2-propyl)-phenylacetamide which may be represented by the following formula

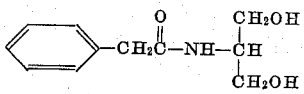

N-(1,3-dihydroxy-2-propyl)-phenylacetamide is a white crystalline compound which melts at about 129–132° C. It is soluble in the common organic solvents such as alcohol, acetone and ethyl acetate, and is appreciably soluble in water. It is relatively insoluble in ether and the hydrocarbon solvents such as petroleum ether.

N-(1,3-dihydroxy-2-propyl)-phenylacetamide may be prepared by phenylacetylating 1,3-dihydroxy-2-propylamine by heating the amine with an alkyl ester of phenylacetic acid such as ethyl phenylacetate, until no more alcohol distills from the mixture. During this heating one of the hydrogen atoms on the amino group of the dihydroxypropylamino radical is replaced by the phenylacetyl group.

As described and claimed in copending application Serial No. 612,535, filed on even date herewith, the novel compound of our invention has been found to exhibit novel and unexpected utility in the preparation of penicillin. By way of contrast, this utility is not possessed by phenylacetylated amino alcohols in general. It is known of course that penicillin may be produced, presumably as a metabolic product, when a Penicillium mold is grown in the presence of a nutrient medium, and the penicillin so produced subsequently may be isolated from the mold and nutrient medium.

As disclosed in said copending application, an accelerated rate of production and an increased yield of penicillin may be obtained by incorporating a relatively small amount of the compound of the present invention in the culture medium of nutrient material in which the Penicillium mold is grown.

Illustratively, by carrying out the process of copending application Serial No. 612,535 by employing, for example, N-(1,3-dihydroxy-2-propyl)-phenylacetamide in a submerged culture process the concentration of penicillin produced in certain tests under comparative conditions has been substantially increased.

The following example further illustrates this invention.

N-(1,3-dihydroxy-2-propyl)-phenylacetamide may be prepared as follows:

9.1 g. of 1,3-dihydroxy-2-propylamine and 16.4 g. of ethyl phenylacetate are heated at about 140° C. for 12 hours, during which time about 5.5 g. of ethyl alcohol distill from the mixture. The reaction mixture is dissolved in warm absolute alcohol, a mixture of ether and petroleum ether added thereto and the solution cooled to about 0° C. N-(1,3-dihydroxy-2-propyl-phenylacetamide crystallizes from the solution. It melts at about 129–132° C. A micro-Dumas analysis has shown the presence of 6.89 percent nitrogen as compared with a calculated value of 6.69 percent.

Other methods of preparation may be used for preparing the N-(1,3-dihydroxy-2-propyl)-phenylacetamide of this invention. Such methods include reacting N-1,3-dihydroxy-2-propylamine with a phenylacetyl halide or heating the amine with phenylacetic acid. The composition of this invention may also be prepared by reacting a 1,3-dihydroxy-2-propyl halide with a metallo derivative of phenylacetamide.

What is claimed is:

N-(1,3-dihydroxy-2-propyl)-phenylacetamide represented by the following formula

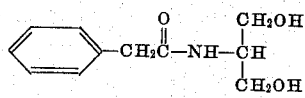

OTTO K. BEHRENS.
JOSEPH W. CORSE.

REFERENCES CITED

The following references are of record in the file of this patent:

UNITED STATES PATENTS

| Number | Name | Date |
| --- | --- | --- |
| 1,990,453 | Hund et al. | Feb. 5, 1935 |

OTHER REFERENCES

Schmidt et al., "Berichte deutsche Chem. Gesell," vol. 52 (1919), pages 398–399.